(12) United States Patent
Myono (10) Patent No.: US 6,946,899 B2
(45) Date of Patent: Sep. 20, 2005

(54) CHARGE PUMP CIRCUIT (75) Inventor: Takao Myono, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/263,405

(22) Filed: Oct. 2, 2002

(65) Prior Publication Data
US 2003/0058030 A1 Mar. 27, 2003

Related U.S. Application Data (63) Continuation of application No. 09/769,034, filed on Jan. 25, 2001, now Pat. No. 6,515,535.

(30) Foreign Application Priority Data

Jan. 26, 2000 (JP) .................................... P. 2000-016442

(51) Int. Cl.[7] .............................. G05F 1/10; G05F 3/02
(52) U.S. Cl. ..................................................... 327/536
(58) Field of Search ................................ 327/536, 589, 327/537; 363/59–60

(56) References Cited

U.S. PATENT DOCUMENTS 5,029,063 A * 7/1991 Lingstaedt et al. ........... 363/60
5,469,110 A   11/1995 Liao .............................. 327/536
5,889,428 A * 3/1999 Young .......................... 327/536
6,160,723 A * 12/2000 Liu ................................ 363/60
6,373,322 B2 * 4/2002 Kobayashi et al. .......... 327/536
6,480,057 B2 * 11/2002 Ogura .......................... 327/536

OTHER PUBLICATIONS

Japanese Translation of Korean Office Action date Jun. 30, 2003.

* cited by examiner

Primary Examiner—Quan Tra
(74) Attorney, Agent, or Firm—Fish & Richardson PC (57) ABSTRACT Charge transfer MOS transistors M1 and M2 at front two stages are constructed of an N-channel type, and charge transfer MOS transistors at rear two stages are constructed of an P-channel type. Inverting level shift circuits S1 and S2 and non-inverting level shift circuits S3 and S4, which can produces an intermediate potential are provided. Because of such a configuration, a charge pump circuit which can realize high efficiency and provide a large output current can be realized. In addition, the gate/source voltage Vgs (transistors are in the ON state) of the charge transfer MOS transistors can be uniformed to 2Vdd.

2 Claims, 11 Drawing Sheets

TIMING OF SIGNAL APPLIED TO GATE OF EACH
CHARGE TRANSER MOSFET IN "PLUS" VOLTAGE
BOOSTING CHARGE PUMP CIRCUIT

FIG.5

VOLTAGE WAVEFORM AT EACH NODE IN
"PLUS" THREE STAGE CHARGE PUMP CIRCUIT

TIMING OF $V_{GS}$ SIGNAL OF EACH CHARGE TRANSER MOSFET IN "MINUS" VOLTAGE BOOSTING CHARGE PUMP CIRCUIT

FIG.8

CONCEPTUAL VIEW OF VOLTAGE WAVEFORM OF EACH NODE IN "MINUS" TWO-STAGE VOLTAGE BOOSTING CHARGE PUMP CIRCUIT

FIG.9

"MINUS" THREE-STAGE VOLTAGE BOOSTING
CHARGE PUMP CIRCUIT

"PLUS" VOLTAGE BOOSTING FOUR-STAGE
CHARGE PUMP CIRCUIT

CHARGE PUMP CIRCUIT

This is a continuation of application Ser. No. 09/769,034 filed Jan. 25, 2001 now U.S. Pat. No. 6,515,535, which in turn, claims priority of Japanese application no. 2000-016442 filed Jan. 26, 2000.

BACKGROUND OF THE INVENTION

This invention relates to a charge pump circuit for use in a power source circuit or the like, and more particularly to a charge pump circuit realizing high efficiency and a large current output.

In the video appliances developed in recent years such as a video camera, digital still camera (DSC), a phone with DSC, etc., CCDs (Charge Coupled Devices) for acquiring an image are used. A CCD driving circuit for driving the CCDs requires a power source circuit which provides ±high voltages (ten and several V) and large currents (several mA). At present, this high voltage is created using a switching regulator.

The switching regulator can create a high voltage with high performance, i.e. high power efficiency (output power/input power). However, this circuit has a defect of generating harmonic noise in current switching, and hence must use a power source circuit as a shield. It also requires a coil as an external component.

On the other hand, the charge pump circuit can create a high voltage with small noise, but conventionally has a defect of poor power efficiency. Therefore, this charge pump circuit cannot be used as it is as a power circuit for a portable appliance which needs excellent power efficiency. If a charge pump circuit with high performance is realized, it can contribute to miniaturization of the portable appliance.

Figure 11:
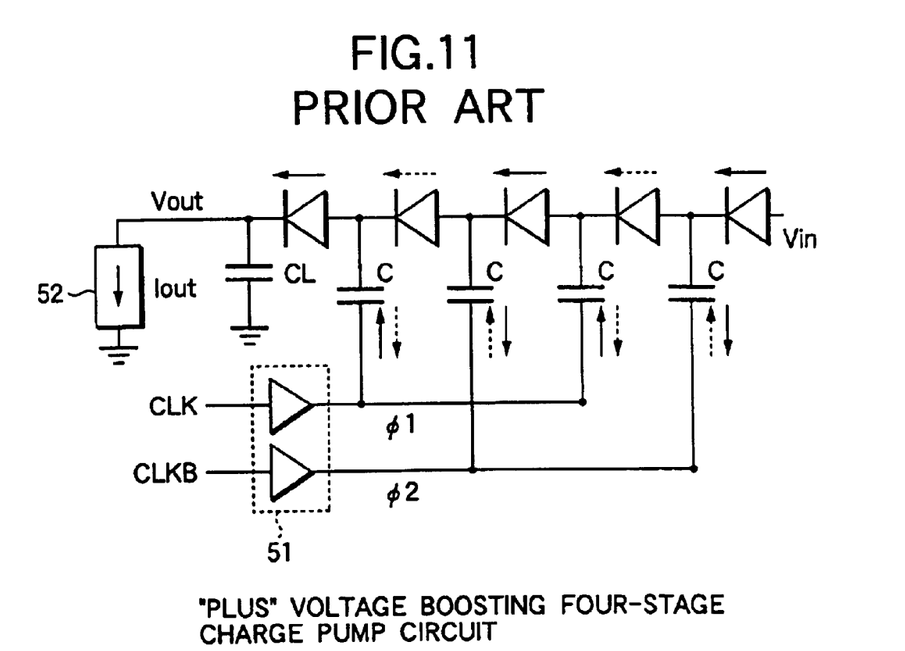
FIG. 11 is a circuit diagram showing a charge pump circuit according to a prior art.

A previously known most basic charge pump circuit is a Dickson charge pump circuit. The details of this circuit are described in a technical journal "John F. Dikson 'On-chip High-Voltage Generation in MNOS Integrated Circuits Using an Improved Voltage Multiplier Technique' IEEE JOURNAL OF SOLID-STATE CIRCUIT, VOL. SC-11, NO. 3 pp. 374–378 JUNE 1976." FIG. 11 is a schematic circuit diagram showing four-stage Dikson charge pump circuit. In FIG. 11, five diodes are connected in series. In FIG. 11, symbol C denotes a coupling capacitor, CL an output capacitor, and CLK and CLKB input clock pulses in opposite phases. Numeral 51 denotes a clock driver and 52 denotes a current load.

In a stable state, where a constant current Iout flows at the output, the input current supplied to the charge pump circuit includes a current coming from the input voltage Vin and current supplied from the clock driver. In disregard of a charging/discharging current to a stay capacitor, these currents are as follows. During the period of Φ1=High and Φ2=Low, the average current of 2Iout flows in a direction of solid arrow. During the period of Φ1=Low and Φ2=High, the average current of 2Iout flows in a direction of broken arrow. In a clock cycle, these average currents are Iout. In the stable sate, the boosted voltage Vout in the charge pump circuit can be expressed by Equation (1)

$$Vout = Vin - Vd + n(V\phi' - Vl - Vd) \quad (1)$$

where Vφ' denotes a voltage amplitude which is generated by a coupling capacitor owing to a change in a clock pulse; Vl denotes a voltage drop generated by the output current Iout; Vin denotes an input voltage which is set at a power source voltage Vdd in "plus" voltage boosting and 0 V in "minus" voltage boosting; Vd denotes a forward bias diode voltage; and n denotes the number of stages of pumping. Further, Vl and Vφ' can be expressed by Equations (2) and (3).

$$Vl = \frac{Iout}{f(C+Cs)} = \frac{2IoutT/2}{C+Cs} \quad (2)$$

$$V\phi' = V\phi \frac{C}{C+Cs} \quad (3)$$

where C denotes a clock coupling capacitance; Cs denotes a stay capacitance at each node, Vφ denotes a clock pulse amplitude; f denotes a clock pulse frequency; and T denotes a clock period. In disregard of the charging/discharging current flowing from the clock driver into the stay capacitor and assuming that Vin=Vdd, the power efficiency of the charge pump circuit can be expressed by Equation (4).

$$\eta = \frac{VoutIout}{(n+1)VddIout} = \frac{Vout}{(n+1)Vdd} \quad (4)$$

In this way, the charge pump circuit performs the voltage boosting in such a manner that a charge is successively transferred to a next stage using a diode as a charge transfer device. However, from the standpoint of mounting the charge transfer device in a MOS integrated circuit, a MOS transistor can be used more easily than a pn-junction diode. For this reason, using the MOS transistor in place of the diode as the charge transfer device has been proposed. In this case, in Equation 1, Vd represents a threshold voltage Vt of a MOS transistor.

Meanwhile, in order to remove the voltage loss corresponding to the threshold voltage to realize a high performance charge pump circuit, the impedance of the charge transfer MOS transistor must be reduced according to the value of Iout. For this purpose, it is efficient to optimize the channel width of the charge transfer MOS transistor and also increase the voltage Vgs between its gate and source to exceed the power source voltage Vdd. The charge pump which has realized this is described in detail in a technical article "Jieh-Tsorng Wu 'MOS Charge Pumps for Low-Voltage Operation' IEEE JOURNAL OF SOLID-STATE CIRCUITS. VOL. 33, NO. 4 APRIL 1998".

Figure 12:
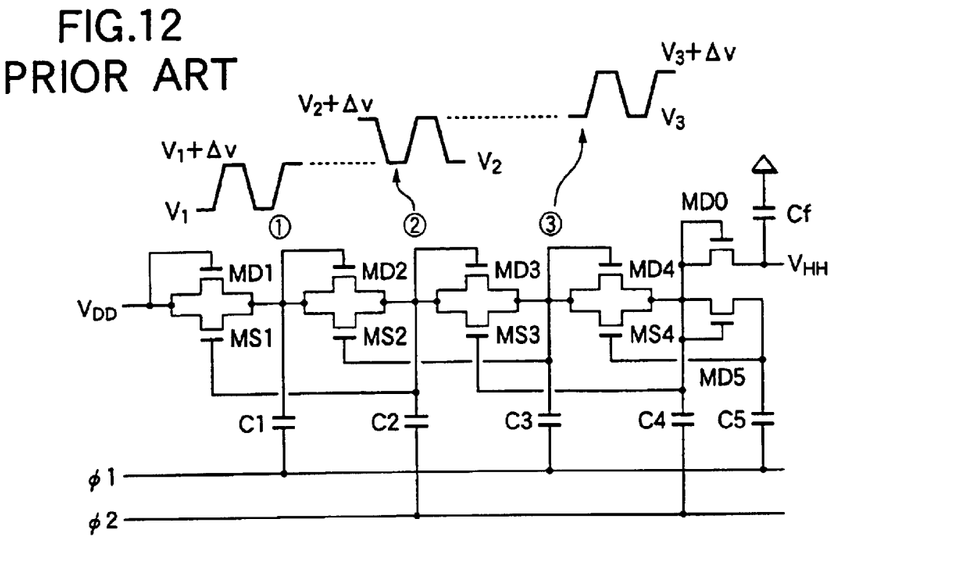
FIG. 12 is a circuit diagram showing a charge pump circuit according to another prior art.

As a result of the investigation of the charge pump circuit described in the above technical article, the inventors of this invention found the following problem. A circuit diagram of a charge pump circuit described in the article is shown in FIG. 12. In FIG. 12, MD1–MD4 which are diodes for initial setting of each pump node do not contribute a pumping operation. The feature of this circuit resides in that the charge transfer MOS transistors MS1–MS3 is supplied with the gate/source voltage Vgs of 2Vdd restored from the boosted voltage at the pumping node in the subsequent stage. However, it is difficult to supply the MOS transistor MS4 in the last stage with Vgs of 2 Vdd so that the voltage loss is inevitably generated.

Figure 13:
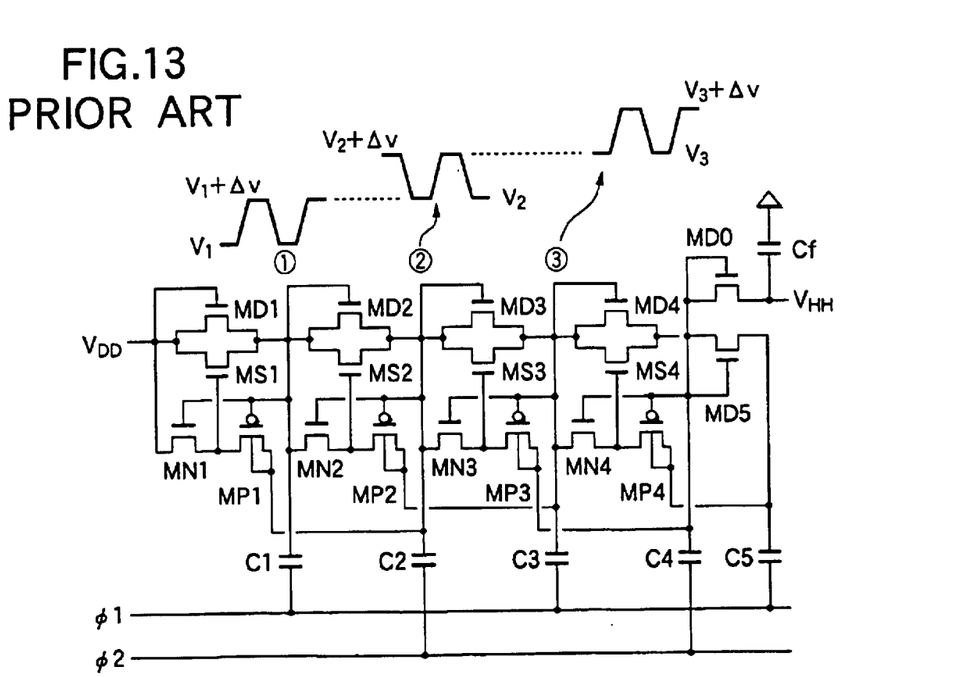
FIG. 13 is a circuit diagram showing still another charge pump circuit according to still another prior art.

Another charge pump described in the above article is a dynamic charge pump as shown in FIG. 13. In this circuit, in order to avoid reduction of Vgs of the MOS transistor MD4 to Vdd+(Vdd−Vth) and that of the MOS transistor MD0 to (Vdd−Vth), a high-voltage clock generator in a boot-strap system is used. All the MOS transistors for MS1–MS4 are constructed of an N-channel type.

Where a current load is small, this system can be effectively used because the charge transfer MOS transistor is small in size and hence the gate stay capacitance is small.

However, in order to realize the charge pump circuit which can provide a large current output, the channel width of the charge transfer MOS transistor must be as large as several milimeters (mm). As a result, the gate stay capacitance of the MOS transistor becomes large (several pF) so that it is difficult to create the clock of 2 Vdd by the boot strap system. Another technique must be proposed for applying the voltage not smaller than the power source voltage Vdd as a gate/source voltage of the charge transfer MOS transistor.

SUMMARY OF THE INVENTION

This invention has been accomplished in order to solve the above problem of the above prior art, and intends to provide a charge pump circuit which realizes high efficiency and provides a large output current. This invention also intends to assure the withstand voltage of a gate oxide film and realize optimum design of a charge transfer MOS transistor by setting the absolute value of the gate/source voltage Vgs of all the MOS transistors at 2Vdd.

According to first aspect of the invention, a charge pump circuit comprises: (n+2) number of charge transfer MOS transistors connected in series, to an initial stage of which is supplied with a prescribed input voltage; coupling capacitors one terminals of which are connected to connecting points between the charge transfer MOS transistors, respectively; and a clock driver for supplying clock pulses opposite to each other alternately to the other terminals of the coupling capacitors, thereby producing a positive boosted voltage, wherein the charge transfer MOS transistors at rear two stages are constructed of a P-channel type and the remaining n number of charge transfer MOS transistors are constructed of an N-channel type, and gate voltage applying circuit means is provided for applying a gate voltage which makes the gate/source voltage of the charge transfer MOS transistors uniform when they turning on.

In accordance with such a means, the voltage loss due to the threshold voltage Vt of the charge transfer MOS transistor can be eliminated to provide a charge pump circuit which realize high efficiency and produce a large output current. In addition, by setting the absolute values of the gate/source voltages Vgs of all the MOS transistors at a prescribed value (e.g. 2Vdd), the withstand voltage of the gate oxide film can be assured stably, thereby realizing an optimum design of the charge transfer MOS transistors.

According to second aspect of the invention, in a charge pump circuit, said gate voltage applying circuit means includes an inverting level shift circuit for on/off controlling said charge transfer MOS transistors of the N-channel type according to said clock pulse, and an non-inverting circuit level shift circuit for on/off controlling said charge transfer MOS transistors of the P-channel type according to said clock pulse, and as a power source on a high potential side of said inverting level shift circuit, the voltage at a connecting point of the rear stage with the boosted voltage is used, and as a power source on a low potential side of said non-inverting level shift circuit, a voltage at the connecting point of the front stage is used.

In accordance with such a means, the inverting level shift circuit and non-inverting level shift circuit can on/off controls the charge transfer MOS transistors to boost a voltage, and set the gate/source voltages Vgs of all the charge transfer MOS transistors at a prescribed value.

According to third aspect of the invention, as a power source on a high potential side of said inverting level shift circuit, a voltage at the connecting point at the stage behind one stage, while as a power source on a low potential side of a low potential side of the non-inverting level shift circuit, a voltage at the connecting point at the stage before one stage is used.

In accordance with such a means, the gate/source voltages Vgs of all the charge transfer MOS transistors can be set at 2Vdd.

According to fourth aspect of the invention, in a charge pump circuit, a boosted voltage of the charge transfer MOS transistor at an intermediate stage is produced as a power source for other circuits.

In accordance with such a means, a power supply circuit for the other circuit which needs a high voltage can be omitted, and the integrated circuit can be designed effectively.

A fifth pump circuit is the third charge pump circuit wherein the clock supplied to said coupling capacitor and the clock pulse supplied to said inverting level shift circuit and said non-inverting level shift circuit are caused to have different duties so that current backflow through said MOS transistors is prevented.

In accordance with such ameans, loss of power consumption can be prevented.

DETAILED DESCRIPTION OF THE PREFERRED EMBODIMENTS

Now referring to FIGS. 1 to 9, an explanation will be given of various embodiments of this invention.

First Embodiment

Figure 1:
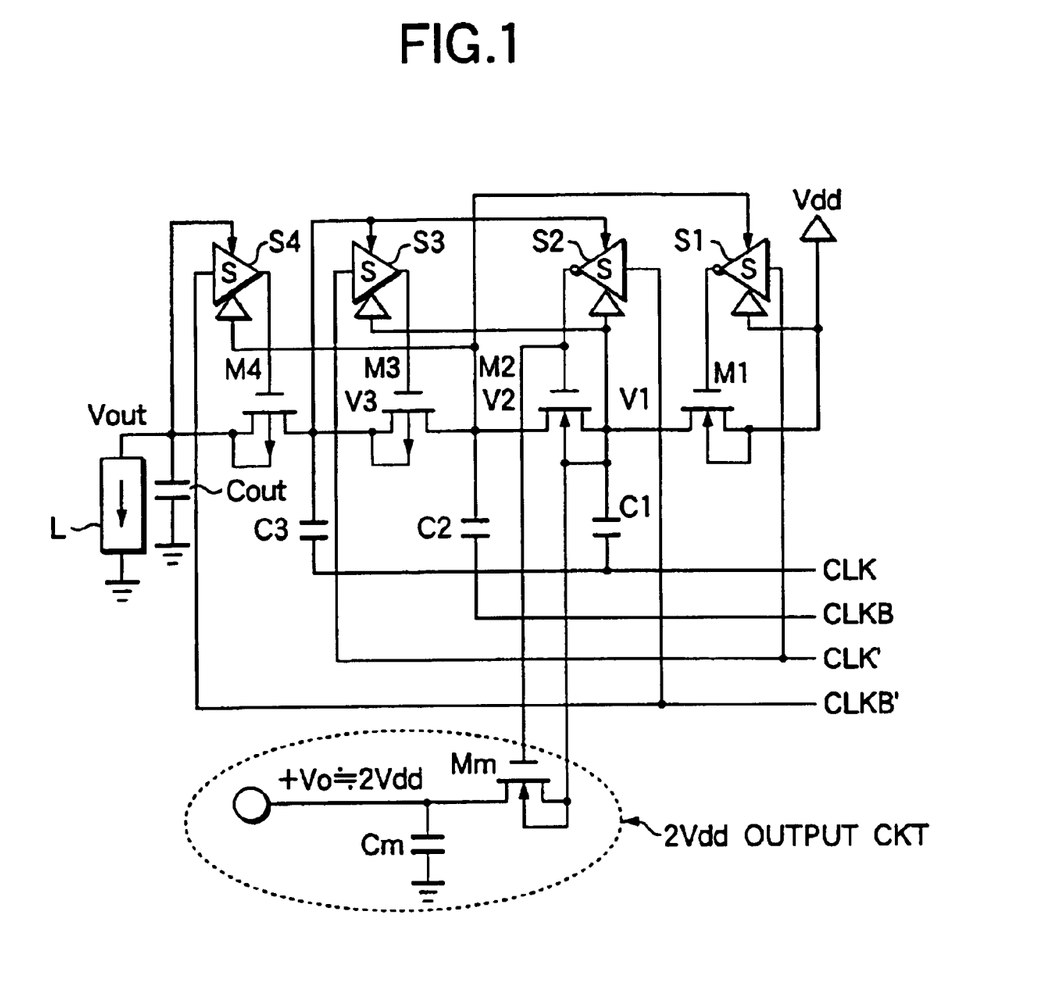
FIG. 1 is a schematic circuit diagram showing a charge pump circuit according to the first embodiment according to this invention.

FIG. 1 is a schematic circuit diagram showing a three-stage charge pump circuit according to a first embodiment.

In FIG. 1, four MOS transistors are connected in series. The feature of this connection resides in that the front M1 and M2 are constructed of a N-channel type and the rear M3 and M4 are constructed of a P-channel type. The source and board of each of M1 to M4 are connected to each other at equal potentials so that the gate/board voltage Vgb is equal to the gate/source voltage Vgs. A power source voltage Vdd as an input voltage Vin is supplied to the source of M1. A boosted voltage Vout is produced from the drain of M4, and supplied to a current load L.

C1, C2 and C3 are coupling capacitors with their one ends connected to the connecting points (pumping node) of the MOS transistors M1 to M4. The other ends of the coupling capacitors C1 to C3 are alternately supplied with a clock pulse CLK and a clock pulse CLKB in opposite phase thereto. The clock pulses CLK and CLKB are produced from a clock driver (not shown). The clock driver is supplied with the power source voltage Vdd.

The gates of the charge transfer MOS transistors M1 and M2 are supplied with outputs from inverting level shift circuits S1 and S2, respectively. The gates of the charge transfer MOS transistors M3 and M4 are supplied with the outputs from non-inverting level shift circuits S3 and S4, respectively.

Figure 2A:
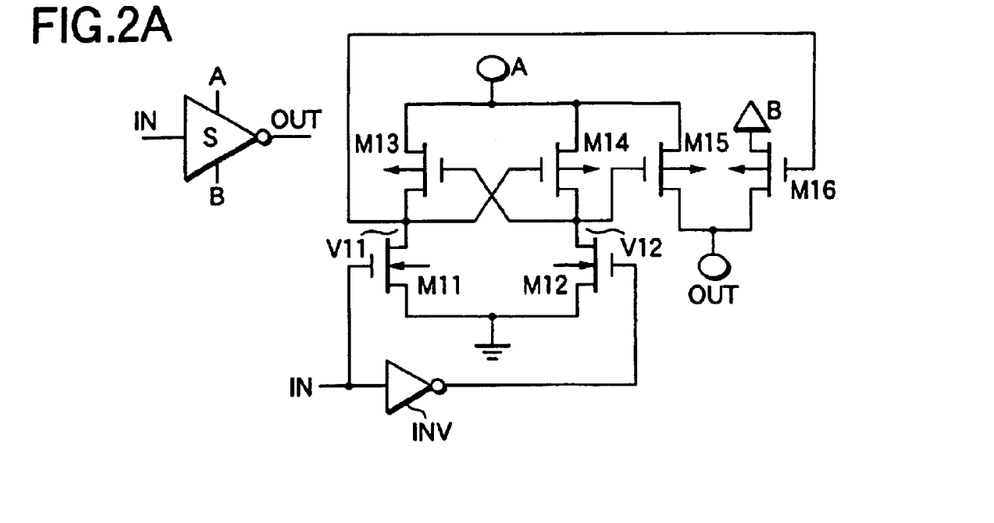
FIGS. 2A to 2C are views showing the configurations of an inverting level shift circuit and the operating waveforms therefore.
Figure 2B:
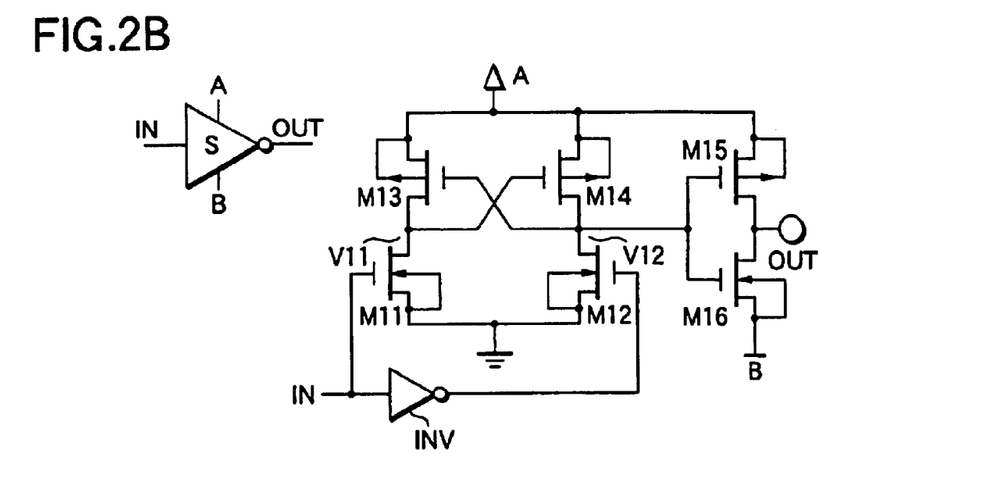
Figure 2C:
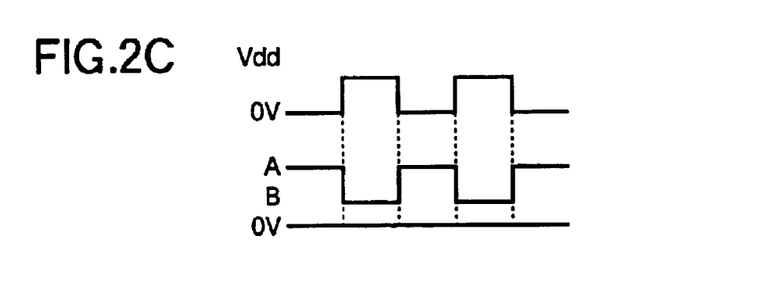

The circuit configuration and operation waveform of the inverting level shift circuit S1, S2 are shown in FIG. 2. As seen from FIG. 2A, this inverting level shift circuit includes an input inverter INV, differential input MOS transistors M1 and M2, and MOS transistors M13 and M14 which are connected in cross.

This inverting level shift circuit further includes MOS transistors M15 and M16 which are connected in pull-up. The gate of the MOS transistor 15 is supplied with a voltage V12 and the source thereof is supplied with a potential A. The gate of the MOS transistor 16 is supplied with a voltage V11 in opposite phase to the voltage V12 and the source thereof is supplied to a potential B. Now it is assumed that potential A>potential B. M11 and M12 are constructed of an N-channel type and M13–M16 are constructed of a P-channel type.

As seen from FIG. 2B, in the level shift circuit having the above configuration, the MOS transistors M15 and M16 may be modified into an inverter configuration.

The operation waveform of the inverting level shift circuit having the above configuration is shown in FIG. 2C. As seen, the conventional level shift circuit alternately produces a high voltage and 0 V, whereas the pertinent level shift circuit produces alternately produces the potential A and the intermediate potential B (A>B>0 V). Using this circuit, as described later, permits the absolute value of the gate/drain voltage of the charge transfer MOS transistor M1, M2 to be fixed to a prescribed voltage (2 Vdd).

Figure 3A:
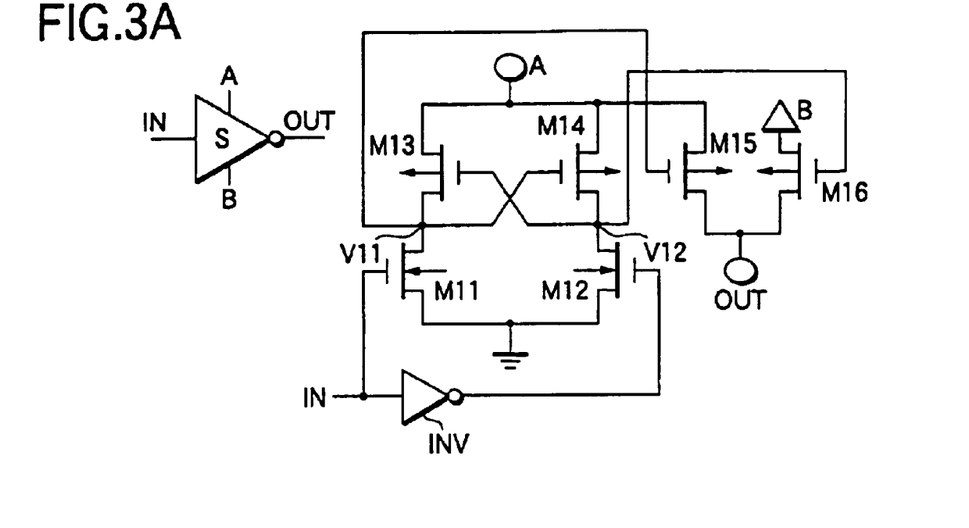
FIGS. 3A to 3C are views showing the configurations of an non-inverting level shift circuit and the operating waveforms therefore.
Figure 3B:
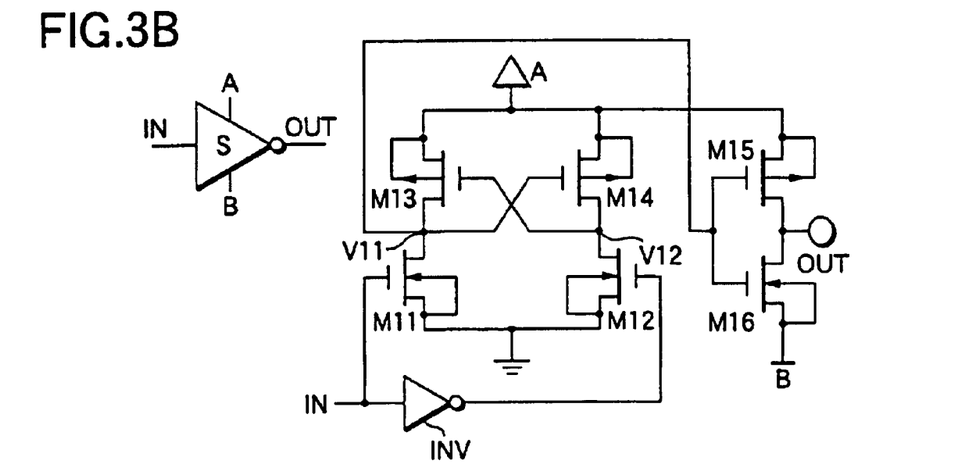
Figure 3C:
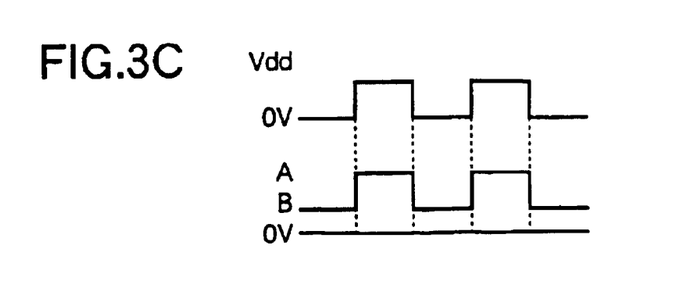

The circuit configuration and operation waveform of the non-inverting level shift circuit S3, S4 are shown in FIG. 3. This non-inverting level shift circuit is different from the inverting level shift circuit S1, S2 in that the gate of the MOS transistor M15 pulled up to the potential A is supplied with the voltage V11 and the gate of the MOS transistor M1 pulled up to the potential B is supplied with the voltage V12 (FIG. 3A). As shown in FIG. 3B, the MOS transistors M15 and M16 may be modified into an inverter configuration.

As seen from the operation waveform of FIG. 3C, this non-inverting level shift circuit S3, S4 performs a non-inverting level shift operation for the input voltage IN. Using this circuit, as described later, permits the absolute value of the gate/drain voltage of the charge transfer MOS transistor M3, M4 to be uniformed into a prescribed voltage (2 Vdd).

Figure 4:
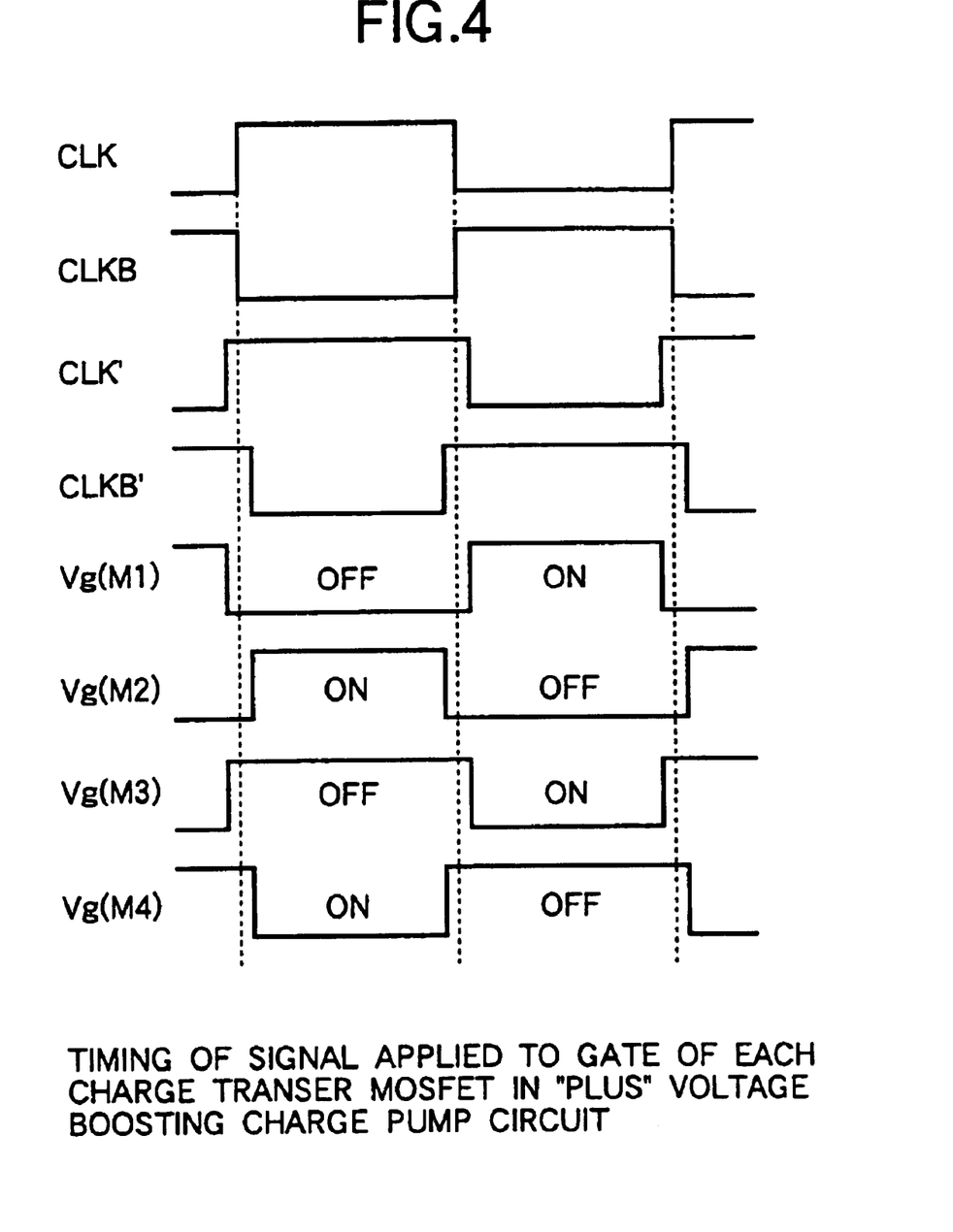
FIG. 4 is a timing chart for explaining the operation of the charge pump circuit according to the first embodiment of this invention.

The inverting level shift circuit S1, S2 and non-inverting level shift circuit S3, S4 are connected to the charge pump circuit as follows. The inverting level shift circuit S1 is supplied with a clockpulse CLK' and the non-inverting level shift circuit S2 is supplied with a clock pulse CLKB'. The clock pulses CLK' and CLKB' are created on the basis of the clock pulses CLK and CLKB, and have shorter "low" periods in order to prevent the back-flow of the current to the charge transfer MOS transistors M1 to M4. Specifically, after the MOS transistors M1 to M4 have been completely turned off, the voltage at each of the pumping nodes is boosted by changes in the clock pulses CLK and CLKB. The relationship among the phases of these clock pulses is shown in FIG. 4.

As shown in FIG. 1, as the power source (potential A) on the high potential side of the inverting level shift circuit S1, the boosted voltage V2 at the pumping node behind the one stage is fed back. Likewise, as the power source (potential A) on the high potential side of the inverting level shift circuit S2, the boosted voltage V3 at the pumping node behind the one stage is fed back. As the power source (potential B) on the low potential sides of the inverting level shift circuits S1 and S2, the voltages Vdd and V1 at the respective stages are applied, respectively.

On the other hand, as the power source (potential B) on the low potential side of the non-inverting level shift circuit S3, the voltage V1 at the pumping node before one stage is used, and as the power source (potential B) of the low potential side of the non-inverting level shift circuit S4, the voltage V2 at the pumping node before one stage is used. As the power source (potential A) on the high potential sides of the non-inverting level shift circuits S3 and S4, the voltages V3 and Vout at the respective stages are applied, respectively.

The feature of the charge pump circuit according to this embodiment can be summarized as follows. First, the front two charge transfer MOS transistors M1 and M2 are constructed of an N-channel type, and the rear two charge transfer MOS transistors M3 and M4 are constructed of a P-channel type. Secondly, there are provided the inverting level shift circuits S1 and S2 and the non-inverting level shift circuits S3 and S4 which can produce the intermediate potential.

In the above configuration, the gate/source voltage Vgs of the charge transfer MOS transistors M1 to M4 (when they are in the "on" state) can be uniformed into 2dd. First, the following relationship holds.

$Vgs(M1)=V2(\text{High})-Vdd$ $Vgs(M2)=V3(\text{High})-V1(\text{High})$ $Vgs(M3)=V1(\text{Low})-V3(\text{Low})$ $Vgs(M4)=V2(\text{Low})-Vout$ Next, as a result of the boosting operation of charge pump in the stationary state, the following relationship holds.

$V1(\text{High})=2Vdd, \quad V1(\text{Low})=Vdd$ $V2(\text{High})=3Vdd, \quad V2(\text{Low})=2Vdd$ $V3(\text{High})=4Vdd, \quad V3(\text{Low})=3Vdd, \quad Vout=4Vdd$ On the basis of these relationships, the absolute values of Vgs of all the charge transfer MOS transistors when they are the "ON" state can be uniformed into the same value 2Vdd as shown in Table 1. For this reason, the ON-state resistance of the MOS transistors M1 to M4 is lowered owing to the high Vgs so that the charge pump which can realize high efficiency and provide a large output current can be realized. Further, since the thickness of the gate oxide film of the charge transfer MOS transistors M1 to M4 may be uniformly designed to be resistant to 2Vdd, the ON-state resistance of the MOS transistors M1 to M4 can be designed to be lower than the case where the voltage Vgs of the charge transfer MOS transistors is not uniform. [Table 1] Gate-source voltage Vgs in the charge transfer MOS transistors

| MOSFET | M1 | M2 | M3 | M4 |
| --- | --- | --- | --- | --- |
| Vgs | 2Vdd | 2Vdd | −2Vdd | −2Vdd |

FIG. 4 is a timing chart for explaining the operation of the charge pump circuit. The charge transfer MOS transistors M1 to M4 alternately repeat on/off according to the clock pulses. Now, the clock pulses CLK' and CLKB', which are applied to the inverting level shift circuits S1 and S2 and non-inverting level shift circuits S3 and S4, have different duties. Namely, the period of "Low" is set to be shorter. Therefore, the ON period of the MOS transistors M1 to M4 becomes short for the following reasons.

Since the charge transfer MOS transistors M1–M4 are not diode-connected, a backward current may flow through these MOS transistors. This attenuates the power efficiency. In order to suppress the backward current, the ON period of the charge transfer MOS transistors M1–M4 is shortened, and while they are off, the clock pulses CLK and CLKB applied to the coupling capacitors are changed to make pumping.

Figure 5:
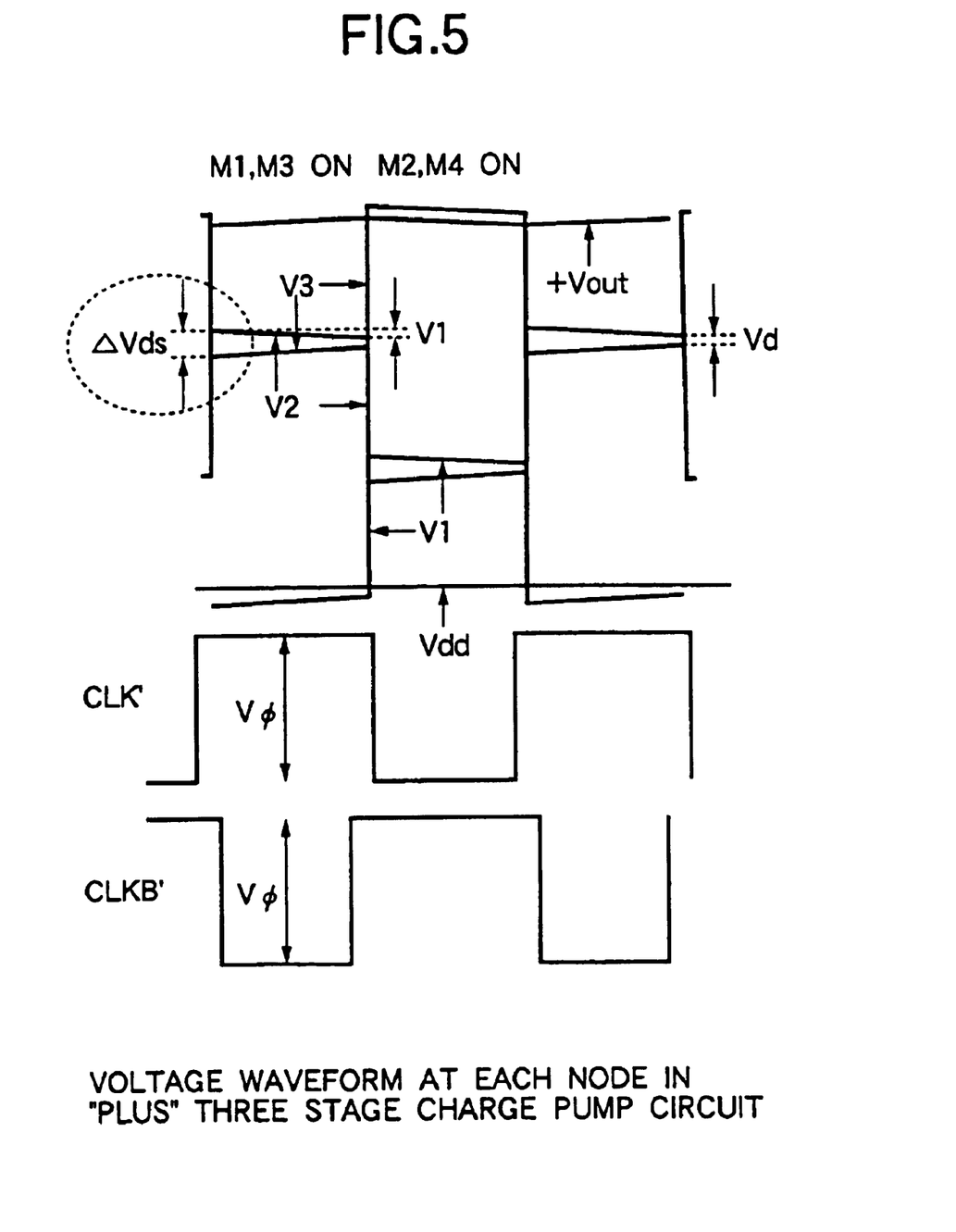
FIG. 5 is a view showing the voltage waveforms at the pumping nodes in the charge pump circuit according to the first embodiment of this invention.

FIG. 5 shows voltage waveforms V1, V2 and V3 at the respective pumping nodes. In FIG. 5, Vφ denotes the amplitude of the clock pulse CLK' and CLKB' and ΔVds denotes a source/drain voltage of the MOS transistor.

Incidentally, in FIG. 1, an output circuit is provided for extracting 2Vdd from the charge transfer MOS transistor at the second stage. This circuit includes a MOS transistor Mm which is controlled by the inverting level shift circuit S2 and a capacitor Cm. This circuit, which provides a stable DC voltage of 2Vdd, is suitable as a power source for the other circuit, e.g. clock driver.

Although the three-stage charge pump circuit has been explained as the embodiment of this invention, the number of stages should not be limited to three. Specifically, the charge pump circuit with any number of stages can be realized in such a manner that the charge transfer MOS transistors are constructed of P-channel type at the rear two state and of N-channel type at the remaining front stages.

Incidentally, in the above three-stage charge pump circuit, the absolute value of Vgs of each of the charge transfer MOS transistors could be uniformed to 2Vdd. However, in the multi-stage charge pump circuit, the absolute value of Vgs of each of the charge transfer MOS transistors can be uniformed to 3Vdd or more.

This can be realized in such a manner that the voltage at the more rear stage connecting node is used as a power source on the high potential side of the inverting level shift circuits S1 and S2 and of the non-inverting level shift circuits S3 and S4.

However, the absolute value of 2Vdd is most suitable in view of the breakdown voltage of the gate oxide film.

Second Embodiment

An explanation will be given of the charge pump circuit according to the second embodiment. Although the charge pump circuit described above performs the "plus" voltage boosting, FIG. 6 proposes a two-stage charge pump which performs a "minus" voltage boosting (voltage boosting lower than 0 V). This two-stage charge pump circuit produces an boosted voltage of −2Vdd, and is suitable to perform the voltage boosting of e.g. −6.5 V.

Figure 6:
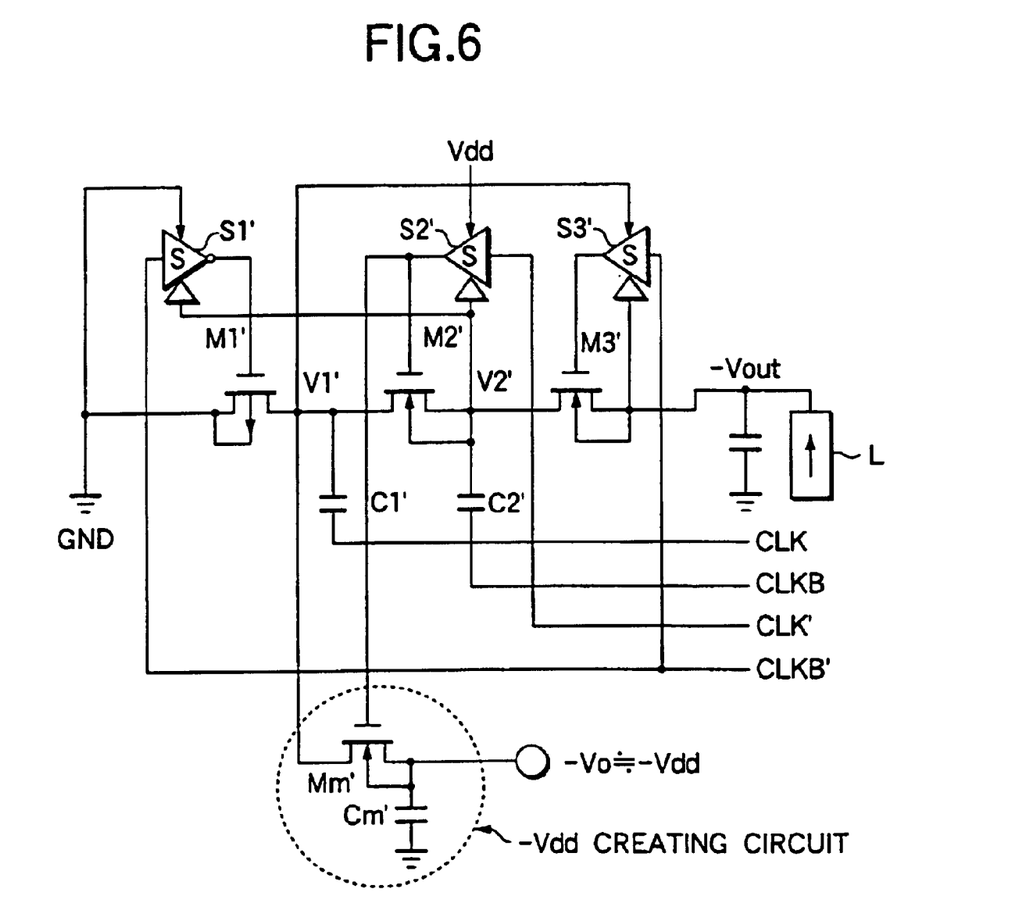
FIG. 6 is a schematic circuit diagram showing a charge pump circuit according to the second embodiment according to this invention.

In FIG. 6, the combination of clock pulses CLK' and CLKB' and the level shifting circuit has been changed. Specifically, the charge transfer MOS transistors M1', M2' and M3 are connected in series and the connecting nodes therebetween are connected to coupling capacitors C1', C2' and C3', respectively. M1' is constructed of the P-channel type with the source connected to ground potential (0 V), and the M2' and M3' are constructed of the N-channel type.

The gate of M1' is supplied with the output from an inverting level shift circuit S1, and the gates of M2' and M3' are supplied with the outputs from non-inverting level shift circuits S2' and S3', respectively. A "minus" boosted voltage of −Vout is produced from the drain of the charge transfer MOS transistor M3' and supplied to a current load L.

Now, in order to the gate/source voltage Vgs (when ON) of the charge transfer MOS transistor M2', the power source on the high potential side of the non-inverting level shift circuit S2' has been set at Vdd. Thus, the absolute value of Vgs (when ON) of the gate/source voltage of each of all the charge transfer MOS transistors M1', M2' and M3' can be set at 2Vdd.

In FIG. 6, an output circuit is provided for extracting −Vdd from the charge transfer MOS transistor M2' at the second stage. This circuit includes a MOS transistor Mm' which is controlled by the non-inverting level shift circuit S2' and a capacitor Cm'. This circuit, which provides a stable DC voltage of −Vdd, can be used for the other circuit.

Figure 7:
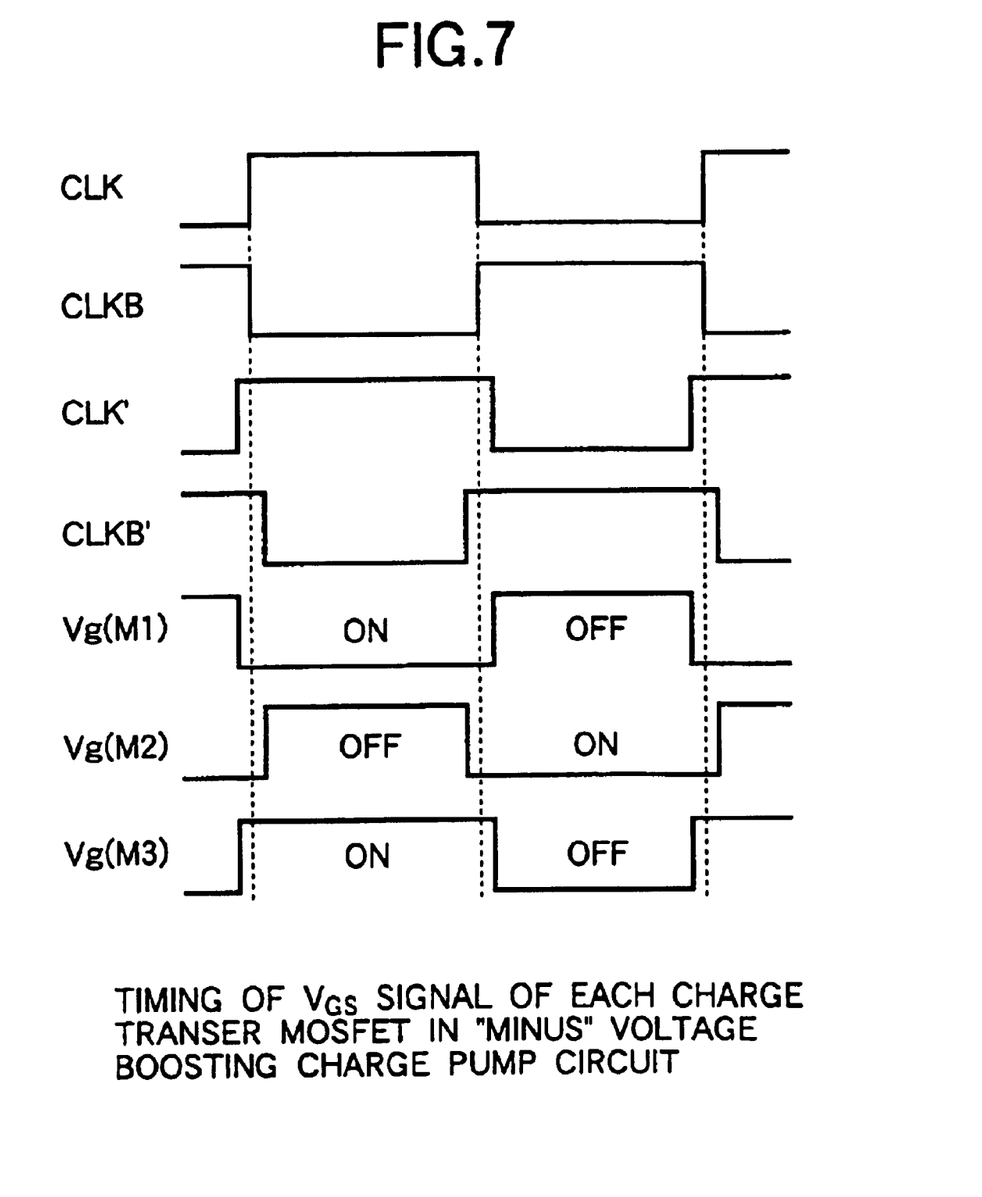
FIG. 7 is a timing chart for explaining the operation of the charge pump circuit according to the second embodiment of this invention.
Figure 8:
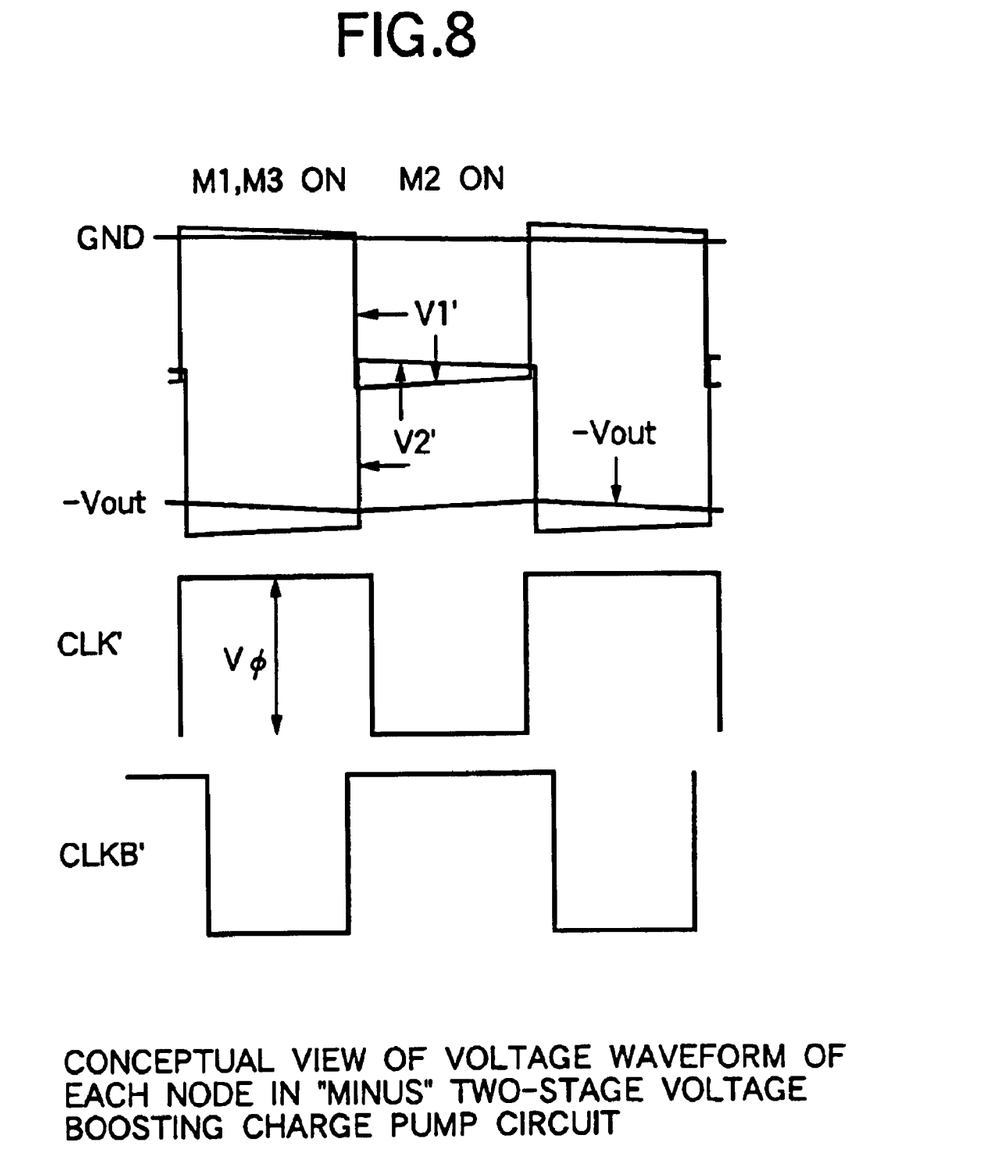
FIG. 8 is a view showing the voltage waveforms at the pumping nodes in the charge pump circuit according to the second embodiment of this invention.

FIG. 7 is a timing chart for explaining the operation of the charge pump circuit having the above configuration. The MOS transistors M1', M2' and M3' alternately repeat the ON/OFF by the voltage Vgs(M1)–Vgs(M3) applied to the gates of the charge transfer MOS transistors M1', M2' and M3'. As seen from FIG. 7, the "Low" period of the clock pulses CLK' and CLKB' is shortened to prevent the backward flow of the current. Incidentally, the voltage waveforms V1 and V2 at the pumping nodes are shown in FIG. 8.

Third Embodiment

Figure 9:
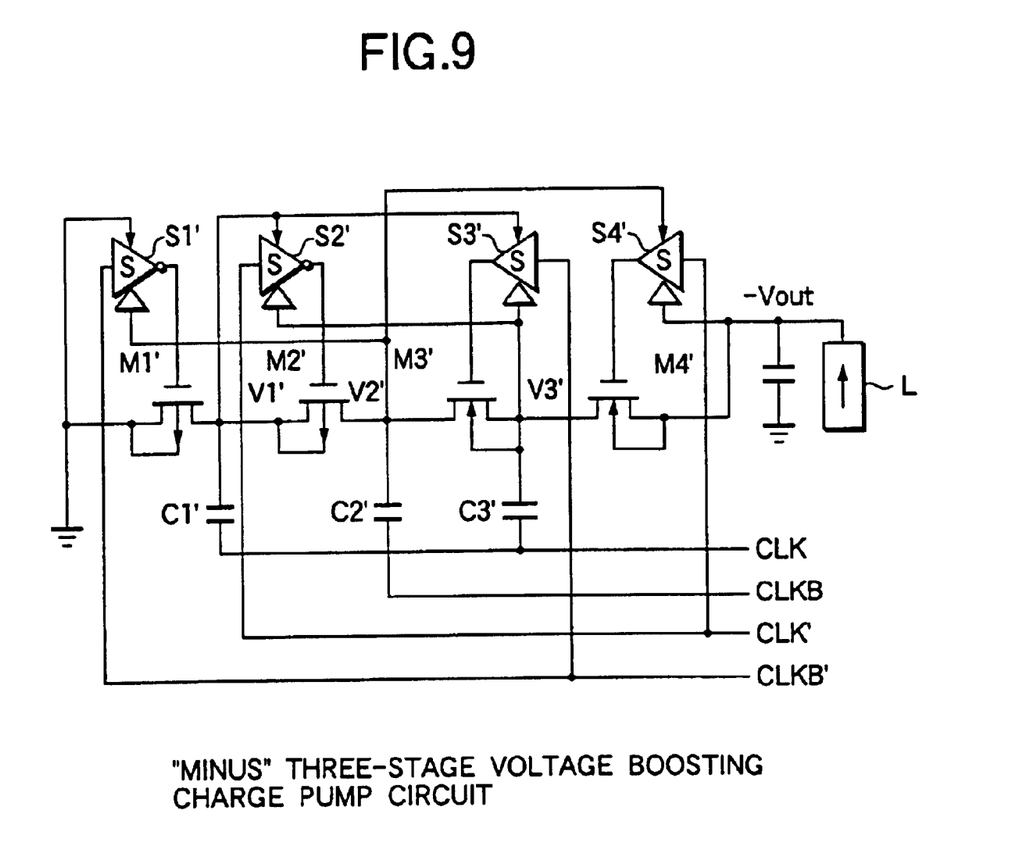
FIG. 9 is a schematic circuit diagram showing a charge pump circuit according to the third embodiment according to this invention.

An explanation will be given of a charge pump circuit according to the third embodiment of this invention. FIG. 9 is a schematic circuit diagram showing a three-stage charge pump circuit for "minus" voltage boosting. The configuration of this circuit basically corresponds to the charge pump circuit shown in FIG. 1 with the polarities of the components being inverted. Namely, the front two charge transfer MOS transistors M1' and M2' are constructed of the P-channel type and the rear two MOS transistors M3' and M4' are constructed of the N-channel type.

As shown in FIG. 9, as the power source (potential B) on the low potential side of the inverting level shift circuit S1', the voltage V2' at the pumping node behind the one stage is fed back. Likewise, as the power source (potential B) on the low potential side of the inverting level shift circuit S2', the voltage V3' at the pumping node behind the one stage is fed back. As the power source (potential A) on the high potential sides of the inverting level shift circuits S1' and S2', the voltages Vss and V1' at the respective stages are applied, respectively.

On the other hand, as the power source (potential A) on the high potential side of the non-inverting level shift circuit S3', the voltage V1' at the pumping node before one stage is used, and as the power source (potential A) of the high potential side of the non-inverting level shift circuit S4', the voltage V2' at the pumping node before one stage is used. As the power source (potential B) on the high potential sides of the inverting level shift circuits S3' and S4', the voltages V3' and −Vout at the respective stages are applied, respectively.

Incidentally, the configuration of each of the inverting level shift circuit S1' and S2' is the same as shown in FIG. 2, and the configuration of the non-inverting level shift circuit S3' and S4' is the same as shown in FIG. 3. The operation of this charge pump circuit can be understood similarly to that of the charge pump circuit performing the "plus" voltage boosting as described previously so that the details thereof will not be made here.

In the above configuration, the absolute value of Vgs of each of all the charge transfer MOS transistors M1' to M4' can be set at the same value 2Vdd. Therefore, the high Vgs reduces the ON resistance of the charge transfer MOS transistors M1'–M4', thereby realizing a charge pump circuit which performs "minus" voltage boosting for a large current with high efficiency. Further, the gate oxide film of each the charge transfer MOS transistors M1'–M4' may be uniformly designed to have a thickness which can withstand 2Vdd so that the ON resistance thereof can be efficiently designed to be lower than the case where the Vgs of the charge transfer MOS transistors.

Although the three-stage charge pump circuit has been explained as the embodiment of this invention, the number of stages should not be limited to three. Specifically, the charge pump circuit with any number of stages can be realized in such a manner that the charge transfer MOS transistors are constructed of P-channel type at the front two stages and of N-channel type at the remaining rear stages.

Fourth Embodiment

Figure 10:
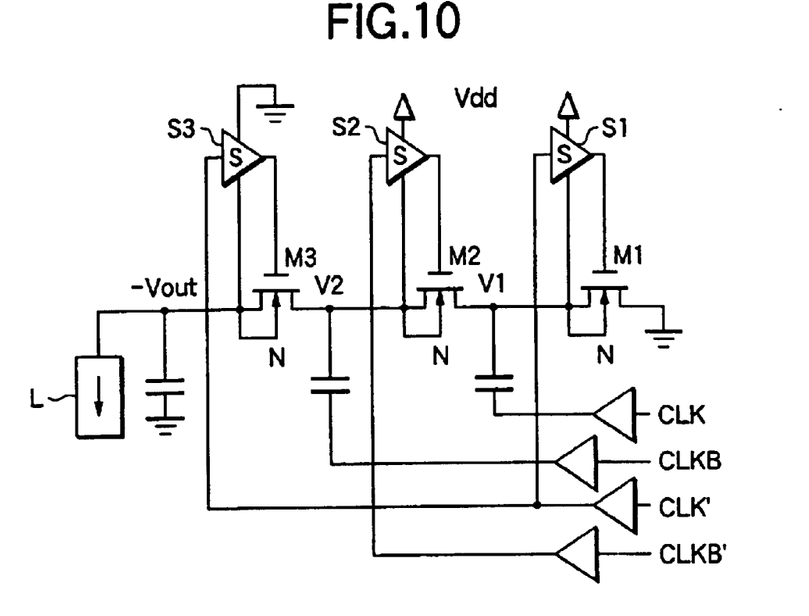
FIG. 10 is a schematic circuit diagram showing a charge pump circuit according to the fourth embodiment according to this invention.

An explanation will be given of the charge pump circuit according to the fourth embodiment of this invention. FIG. 10 is a schematic circuit diagram showing a two stage charge pump circuit performing "minus" voltage boosting. This charge pump circuit is different from the two-stage charge pump circuit in the following two points.

1) All the charge transfer MOS transistors M1, M2 and M3 are constructed of the N-channel type.

2) As the ON voltage (gate voltage when ON) of the MOS transistors, Vdd or GND is used. Specifically, as the power sources on the high potential side of the non-inverting level shift circuits S1, S2 and S3, Vdd, Vdd and GND are used, respectively.

Therefore, in this charge pump circuit, the Vgs when the charge transfer MOS transistor is Vdd for M1, and 2Vdd for M2 and M3. In this way, unlike the two stage pump circuit according to this embodiment, in the charge pump circuit according to this embodiment, Vgs of the all the charge transfer MOS transistors cannot be set at the same value.

However, since all the MOS transistors are constructed of the same channel type, the manufacturing process can be simplified as compared with the second embodiment.

Concretely, in the second embodiment, a triple well structure is necessarily required, whereas in this embodiment, a twin well structure can be used, thereby saving the number of steps of the manufacturing process.

In accordance with this invention, since a higher voltage than the threshold voltage can be applied as a gate/source voltage of the charge transfer MOS transistor, a high efficiency charge pump circuit with no voltage loss can be provided.

Since the ON resistance of the charge transfer MOS transistors M1 to M4 is reduced owing to the high gate/source voltage which is higher than the absolute value of 2Vdd, a charge pump circuit which can realize high efficiency and provide a large output current.

Further, since the gate/source voltages and gate/substrate voltages of the charge transfer MOS transistors can be uniformed to a prescribed voltage (e.g. 2Vdd in the absolute value), the thickness of the gate oxide film may be evenly designed to endure 2Vdd in the absolute value. Thus, the ON resistance can be designed to be lower than in the case where the gate/source voltages Vgs of the charge transfer MOS transistors are not uniform.

Further, in accordance with this invention, a charge pump circuit for "plus" voltage boosting or "minus" voltage boosting can be provided, and the number of stages of charge pump can be set optionally so that a desired boosted voltage can be obtained.

What is claimed is:

1. A charge pump circuit comprising:

(n+1) number of charge transfer MOS transistors being connected in series;

coupling capacitors each having a first terminal coupled to a connecting point between the MOS transistors; and a clock driver for supplying clock pulses opposite to each other alternately to a second terminal of the coupling capacitors, wherein the charge transfer MOS transistors at a rear single stage are of a P-channel type and the remaining n number of the charge transfer MOS transistors are of N-channel type, and wherein gate voltage applying circuit means is provided to apply a gate voltage which makes the gate/source voltages of said MOS transistors uniform when they turn on, wherein said gate voltage applying circuit means includes an inverting level shift circuit for on/off controlling of said N-channel type charge transfer MOS transistors according to said clock pulse, and a non-inverting circuit level shift circuit for on/off controlling of said P-channel type charge MOS transistor according to said clock pulse, and wherein a voltage at the connecting point of the rear stage with the boosted voltage is used as a power source on a high potential side of the inverting level shift circuit, and a voltage at the connecting point of the front stage is used as a power source on a low potential side of the non-inverting level shift circuit.

2. A charge pump circuit according to claim 1 wherein:

a voltage at the connecting point at the stage behind a particular stage is used as a power source on a high potential side of the inverting lever shift circuit, and a voltage at the connecting point at the stage before the particular stage is used as a power source on a low potential side of the non-inverting level shift circuit.

* * * * *